United States Patent [19]
Evans et al.

[11] 3,819,008
[45] June 25, 1974

[54] BROAD BAND ACOUSTIC BARRIER
[75] Inventors: Robert C. Evans; Horst W. Hehmann, both of Cincinnati, Ohio
[73] Assignee: General Electric Company, Cincinnati, Ohio
[22] Filed: Oct. 19, 1972
[21] Appl. No.: 299,159

[52] U.S. Cl............ 181/33 D, 181/33 G, 181/33 H, 181/50, 181/71
[51] Int. Cl. ........................ E04b 1/99, G10k 11/08
[58] Field of Search ........ 181/33 H, 33 HA, 33 HB, 181/50, 33 D

[56] References Cited
UNITED STATES PATENTS
| | | | |
|---|---|---|---|
| 2,759,554 | 8/1956 | Baruch | 181/33 G |
| 2,853,147 | 9/1958 | D'Eustachio | 181/50 |
| 3,113,634 | 12/1963 | Watters | 181/50 X |
| 3,144,913 | 8/1964 | Bailey | 181/33 HB |
| 3,533,486 | 10/1970 | Paulson | 181/50 |
| 3,610,262 | 10/1971 | Wise | 181/33 HA |

Primary Examiner—Stephen J. Tomsky
Assistant Examiner—Vit N. Miska
Attorney, Agent, or Firm—James M. Kipling; Derek P. Lawrence

[57] ABSTRACT

The entrance to a fan duct of a gas turbine engine is provided with a plurality of circumferentially spaced projections or barriers extending radially inwardly from the wall of the duct. Each barrier is formed of a sound absorbing material, for example a honeycomb material covered with a resistive face sheet consistent with sound absorption. Each barrier has a varying circumferential width configuration wherein the greatest width abuts the duct wall and the width tapers to a minimum near the radially inwardmost point. The number and circumferential spacing of the barriers can be varied according to optimization of individual engine situations. The axial disposition of the barriers is such that the fluid wakes created thereby are substantially attenuated before interference with the fan blade.

12 Claims, 4 Drawing Figures

PATENTED JUN 25 1974 3,819,008

BROAD BAND ACOUSTIC BARRIER

BACKGROUND OF THE INVENTION

The present invention relates to gas turbine engines, and more particularly to sound suppression thereof.

Recent trends toward minimizing the sound emanations from gas turbine engines, and particularly with those associated with aircraft, are facets of the environmental awareness which has been gaining momentum of late throughout the world. A redefinition of the word "progress" has been taking place, as the people become more aware of the impact of materialistic advances upon their surroundings, the latter having been taken for granted throughout history.

In the area of gas turbine engines, the addition of fans thereto has resulted in the creation of a new noise source. Effective strides have been taken to substantially reduce sound emanating from the aft portion of engines originating in both the core and fan elements; however, forward sound emission remains a problem. Characteristic of such forward sound are fan tones, broad band noise, and multiple pure tones or MPTs (a modulation phenomenon generated by fan tips rotating at speeds approaching and exceeding Mach I).

One form of prior art attempted remedy to this situation is the creation of a fan duct inlet restriction which results in inlet air speed approaching Mach I. This concept has proven effective in that sound cannot penetrate a Mach I barrier; however, such devices have proven to lessen the efficiency of associated engines, in addition to difficulty to maintaining a Mach I barrier at slow air speeds.

Another prior art treatment is the disposition of an annular splitter formed of acoustical absorbent material within the fan inlet duct. Such devices are very efficient at lessening the emanation of certain varieties of generated sound. However, recent experimentation has disclosed the fact that certain varieties of this sound (in particular the MPT tones and certain broad band noise) emanate in a spiral wave form with heaviest concentrations near the duct wall. This discovery would seem to indicate that such noise phenomena would not be effectively treated by annular splitters, in that the particular variety of noise propagation occurs in a spiral coaxial with such splitters and hence bypasses the splitters.

The present invention provides an effective solution to this and other noise problems by positioning within a duct inlet a plurality of radially extending barriers or projections cantilevered from the duct wall in such a fashion as to intercept the spiraling sound waves as they progress from the fan upstream toward the inlet. These struts have been found to reduce such noise by approximately 90 per cent of the associated energy thereof.

BRIEF SUMMARY OF THE INVENTION

It is therefore a primary object of the present invention to provide a sound suppression means for use in gas turbine engines which effectively reduces a variety of noise emanations while avoiding adverse effects upon the efficiency of the engine.

To accomplish the foregoing as well as further objects which will become apparent hereinafter, the present invention, in one form thereof, provides a sound-energy diminishing barrier for use within a duct, wherein the barrier includes a first face extending substantially radially within the duct from the duct wall; a second face extending substantially radially within the duct and canted toward the first face such that the spacing between the first and second faces varies in the radial direction from a maximum near the radially outward face extremities at the duct wall to a minimum near the radially inward extremity of the two faces at which point a common junction therebetween is made; and a sound absorbing material disposed between the first and second faces, the material being a honeycomb or other type material whose sound frequency absorbing character varies as a function of length (the length being equivalent to the circumferential width in this instance of the material disposed between the faces of the barrier). The barrier is provided with a resistive face sheet which cooperates with one of the faces. The barrier extends axially along the duct wall and is generally airfoil in configuration in order to minimize wake created thereby within a fluid stream passing through the duct.

BRIEF DESCRIPTION OF THE DRAWING

The present invention will be described in particularity hereinafter in conjunction with the appended drawing wherein.

DETAILED DESCRIPTION OF A PREFERRED EMBODIMENT

Figure 1:
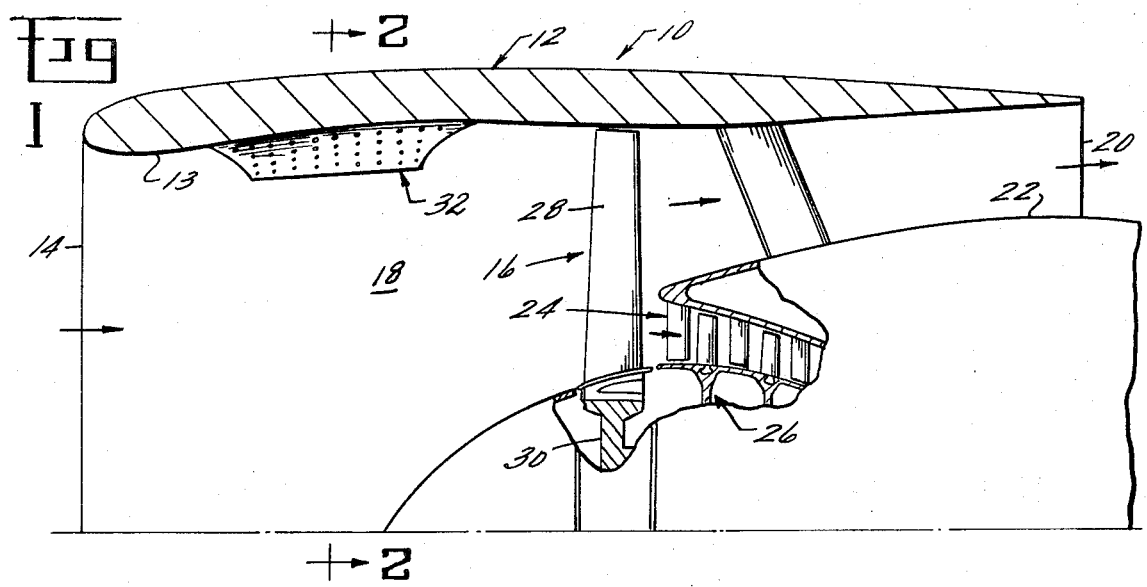
FIG. 1 depicts a cross-sectional representation of a portion of a gas turbine engine incorporating the present invention.

Referring now to the drawings wherein like numerals correspond to like elements throughout, reference is particularly made to FIG. 1 wherein a turbofan engine 10 is shown to include an outer cowling 12 including a duct wall 13 defining the outer bounds of the flow path of air entering an inlet 14. Air thus entering the flow path is pressurized by a low pressure compressor or fan 16. The flow path includes a duct or passage 18 circumscribed by duct wall 13. The radially outer portion of the pressurized air is discharged through an annular nozzle 20 formed by the downstream end of the cowling 12 and an inner nacelle 22. The inner portion of the air pressurized by the fan 16 enters an inlet 24 to a core engine generally designated by the numeral 26. The air entering inlet 24 is further pressurized in a known fashion, to support combustion of a fuel in the generation of a hot gas stream. This hot gas stream, in turn, provides the motive power for the fan 16.

The fan 16 comprises a plurality of rotatable blades 28 which are radially mounted on a fan rotor 30. The fan rotor 30 is driven by a turbine (not shown) which forms part of the core engine 26. Operation of the core engine 26 creates a source of sound energy or noise which emanates upstream through passage 18 and out the inlet 14, unless checked in some fashion. Similarly, the rotation of fan 16 serves to propagate sound energy upstream through passage 18. The noise thus generated by the core engine 26 and fan 16 takes the form of a combination of sound frequencies. In addition, rotation of the radially outward tips of fan blades 28 at a velocity approaching and exceeding Mach I results in the generation of MPT noise (multiple pure tones) which have been found to traverse passage 18 in a spiral path with greatest concentration near duct wall 13.

Figure 2:
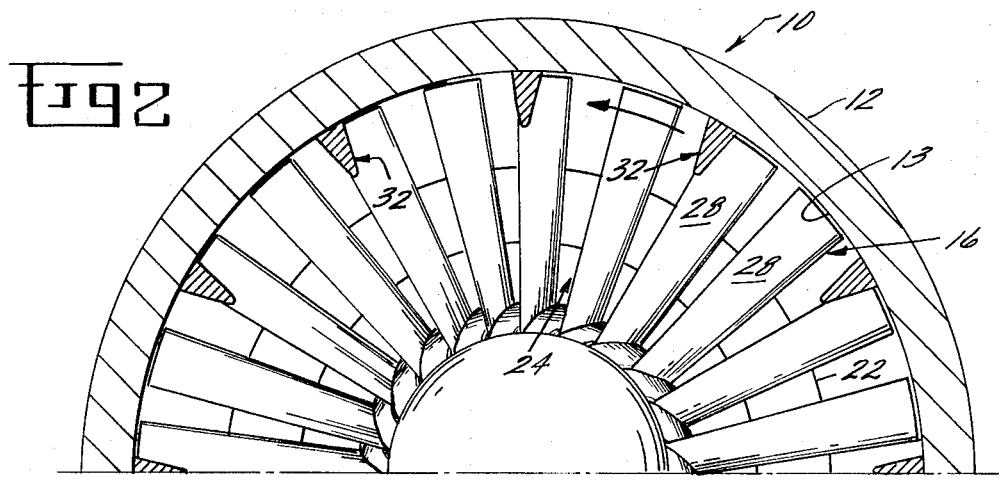
FIG. 2 is a sectional view of the engine of FIG. 1 taken along line 2—2 of FIG. 1.
Figures 3, 4:
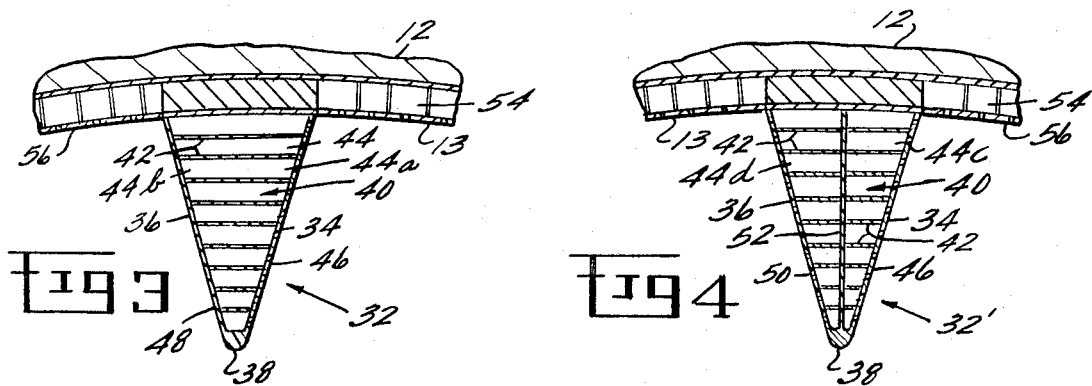
FIG. 3 is an enlarged view of an individual sound energy diminishing barrier according to the present invention.
FIG. 4 is an alternative embodiment of a barrier according to the present invention.

In order to intercept and diminish such a wide spectrum of sound energy frequencies, and substantially prevent their emanation from inlet 14, the present invention provides a plurality of sound energy diminishing barriers 32 spaced about the circumference of duct wall 13. FIGS. 1 through 3 disclose the configuration and orientation of barriers 32, and reference is made to these Figures with respect to the following description thereof. Each barrier includes a first face 34 extending substantially radially within the passage or duct 18 and originating in a cantilever fashion from duct wall 13. A second face 36 extends substantially radially within the duct 18 and is canted or tilted toward the first face 34 from a point of origin associated with duct wall 13 to a common junction, in this case a linear intersection at 38. As a result, the spacing (circumferential distance) between the first and second faces 34 and 36 varies in the radial direction with respect to the duct 18 from a maximum near the radially outward extremities of the faces (and duct wall 13) to a minimum near the radially inward extremities thereof.

A sound absorbing material 40 is disposed between faces 34 and 36, the material being constructed so that it is tuned to absorb sound of varying frequencies as a function of the length of material (in this case the circumferential width of the material between first and second faces). For example, as depicted in FIG. 3, the sound energy absorbing material may comprise a plurality of resonance chambers of substantially parallel and circumferentially extending panels and spaces serially interspersed with one another, the panels designated 42 and spaces 44, each space 44 defined by a predetermined number of panels 42, and each space being open-ended, the open ends 44a and 44b cooperating respectively with faces 34 and 36. It is known that such honeycomb material, when appropriately isolated from the surrounding environment, will absorb and dissipate sound energy in frequency bands according to and a function of the lengths of spaces 44. In the present embodiment, the honeycomb structure filler material substantially fills the space between faces 34 and 36, and the material extends from the first face to the second face. As a result of the disposition of the honeycomb material 40 between canted faces 34 and 36, spaces 44 of varying length are created. Thus, an individual barrier 32 contains a plurality of honeycomb spaces 44 of varying lengths and of varying sound frequency absorption characteristics.

As stated hereinabove, it has been found that fan gas turbine engines produce many types and frequencies of sound. More particularly, MPT tones generated by fan tips rotating at near Mach I have been found to include sound waves of primarily 600 to 800 cycles per second. Furthermore, the MPT tones have been found to emanate from the fan tips in a spiral rotating in the same direction as the fan blades. In order to eliminate a substantial portion of such sound as well as core engine and other fan noise, the present invention disposes the maximum width of sound absorbing material 40 proximate the duct wall 13. Additional honeycomb space 44 widths are pyramided upon one another and extend into the duct 18 for the purpose of intercepting sound energy not adhering to duct wall 13, as well as noise of frequencies other than those absorbed by the remaining honeycomb material.

In order to admit sound energy into the honeycomb spaces 44 as well as to prevent its exit therefrom, the present invention provides a resistive face sheet 46 to overlie and cooperate with face 34 of barrier 32. The face sheet 46 may be perforated, as shown in FIG. 1, or may otherwise permit the influx of sound energy. Face 34 is selected for application of the face sheet 46 because the spiraling sound approaches barrier 32 in the direction of rotation of blades 28, hence from the side represented by face 34. The remaining face 36 is covered by a solid face sheet 48 which prevents entry or exit of sound energy.

It has been found through experimentation that suitable noise reduction may be achieved by the utilization of barriers of the variety described herein which may also be dimensioned and configured to present a minimum of efficiency hindrance to operation of an associated engine. More particularly, the radial height of individual barriers 32 may be between 15 and 20 percent of the associated duct radius and accomplish substantial sound reduction while maintaining suitable efficiency. The barriers have been found to absorb appropriate noise frequencies of 600 to 800 cycles per second when constructed with a maximum width near the duct wall of 4 to 6 inches. For the purposes of maintaining structural integrity as well as achieving a desirable barrier taper for broad band sound absorption, the barrier can taper to a 1/2-inch minimum thickness near the radially inward extremity thereof.

It has been found that turbulence induced within the air flowing through duct 18 upstream of fan blades 28 results in increased sound propagation due to the impact of various portions of the turbulent fluid with individual fan blades. For this reason, barriers 32 are positioned and configured in such a way that wakes created within the fluid in duct 18 are kept to a minimum magnitude as well as spaced from the fan blades in order to attenuate their significance before interference with the blades. These desirable results have been found to occur when the individual barriers 32 are formed with a generally airfoil cross-sectional configuration wherein the leading edge and trailing edge of the barriers are tapered in the axial direction. Such a configuration tends to minimize wake production. Furthermore, it has been found to be advantageous to space the barriers upstream of the fan blades by at least two fan chord lengths (corresponding to the individual chord lengths of each of the substantially uniform fan blades). At this distance, whatever wake may be formed by the airfoil shaped barrier 32 would be substantially dispersed within the moving fluid and its effects attenuated before interference with fan blades 28.

In operation, fan blades 28 of fan 16 disposed within duct 18 drive a flow of air through the duct 18 and, in conjunction with core engine 26, produce noise or sound energy which propagates upstream within duct 18 in various manners. The tips of fan blades 28 generate MPT tones as they approach Mach I in velocity, and these MPT tones propagate in a spiral wave fashion with greatest noise concentration near duct wall 13. This noise is joined by other varieties of noise of varying frequencies. As it progresses upstream, the noise encounters resistive face sheets 46 of individual barriers 32, and penetrates the face sheets entering spaces 44. As a result of the varied lengths of spaces 44, discrete bands of sound frequency are absorbed by individuals of the spaces, the noise reverberating within these spaces and prevented from escaping therefrom until dissipated. According to a major object of the present invention, each barrier 32 presents spaces 44 of a variety of length (circumferential width) with the result that a plurality of bands of noise frequencies are absorbed by each barrier 32. An additional advantage is realized by the disposition of the largest spaces 44 near the duct wall 13 in that low frequencies (600 to 800 cps) of noise generated and MPT tones concentrate near the duct wall and are effectively absorbed by the large spaces.

In this way, a large percentage of sound waves of wide frequency bands are absorbed and diminished by the barriers 32 of the present invention. While the low frequency, high concentrations of noise are absorbed by the circumferentially thick spaces 44 of barriers 32, higher frequency noise is absorbed by circumferentially thinner spaces 44 (that is, by the shorter resonance cavities) toward the radially innermost portions of barrier 32. Furthermore, the configuration of the barriers is such that efficiency of the engine is not penalized, nor are noise producing waves created by barriers which interfere sybstantially with the individual fan blades 28.

FIG. 4 depicts an alternative embodiment of a barrier 32', according to the present invention, wherein the solid face sheet 48 of FIG. 3 is replaced by a second resistive face sheet 50, and this face sheet 50 cooperates with the second face 36 of barrier 32'. The other face 34 of barrier 32' is similar to that in FIG. 3 and cooperates with a face sheet 46 also similar thereto. An additional distinction is the disposition of a partition between faces 34 and 36 extending radially and axially with respect to barrier 32' and which divides each of the spaces 44 into two parts 44c and 44d. This configuration is appropriate for situations wherein less than a substantial majority of noise propagation spirals in a single direction within duct 18. Such a situation may occur where a plurality of fans of the counterrotating variety are disposed within a single duct, each fan generating its own noise patterns. In such a situation, the operation of each circumferential half of the barrier 32' would be the same as that described above with respect to barrier 32. It may be necessary to thicken the barrier near its junction with the associated duct wall 13 for the purpose of tuning the spaces 44c and 44d to absorb appropriate frequencies of noise, since partition 52 effectively halves the resonant chamber length of each space.

It is to be noted that the barriers 32 and 32', and the variations thereof according to the concepts of the present invention, may be applied to duct walls already treated with sound proofing. For example, in FIGS. 3 and 4, barriers 32 and 32' are shown to extend radially inwardly from engagement with duct wall 13, the wall incorporating honeycomb resonant chamber structures 54 covered by annular resistive face sheets 56. In this situation, the duct wall honeycomb 54 operates in the fashion known in the art and absorbs a substantial quantity of sound to supplement the sound suppression of barriers 32 and 32'.

The foregoing represents a preferred embodiment of the present invention. It is apparent that those skilled in the art may substantially vary the particular embodiment described without departing from the spirit and concepts of the present invention. For example, the sound absorbing material 40 disclosed herein to be honeycomb material may be replaced by any sound absorbing material tuned to frequency bands by which broad band absorption is facilitated. Furthermore, while faces 34 and 36 of barriers 32 and 32' have been discussed as covered by and cooperating with resistive face sheets and other planar elements, these faces can represent no more than the external surfaces of the associated sound absorbing material. These and other variations which do not depart from the scope of the present invention are to be covered by the appended claims.

What is claimed and considered new and desired to be secured by Letters Patent of the United States is:

1. A sound-energy diminishing barrier for use within a duct adapted to pass therethrough a high velocity gas flow in the axial direction and having a generally circular cross section, the barrier comprising:

a first face extending substantially radially and having its length aligned generally axially within the duct;

a second face extending substantially radially and having its length aligned generally axially within the duct the second face being canted toward the first face such that the spacing between the first and second faces varies in the radial direction; and a sound absorbing material disposed between the first and second faces and defining chambers between said faces, said material being constructed so that it is tuned to absorb sound of varying frequencies as a function of the volume of said chambers.

2. The barrier of claim 1 wherein the cant between the first and second faces is such that the distance therebetween generally tapers from a maximum near the radially outermost extremities thereof respectively toward a minimum.

3. The barrier of claim 2 wherein said sound absorbing material extends substantially from said first face to said second face.

4. The barrier of claim 3 wherein said sound absorbing material substantially fills the space between said first and second faces.

5. The barrier of claim 3 further comprising a first resistive face sheet in cooperation with said first face.

6. The barrier of claim 5 wherein said sound absorbing material comprises a honeycomb structure.

7. The barrier of claim 6 wherein said honeycomb structure comprises substantially parallel circumferentially extending panels and spaces serially interspersed with one another, each space defined by a predetermined number of said panels and each space being open-ended, the open ends of the spaces cooperating with said first and second faces respectively.

8. The barrier of claim 7 further comprising a partition disposed between the first and second faces and dividing each of said spaces into two parts, and further including a second resistive face sheet in cooperation with said second face.

9. The barrier of claim 3 wherein said first and second faces extend substantially radially inwardly from a point proximate the duct wall.

10. The barrier of claim 9 wherein said first and second faces extend axially of the duct and cooperate in a substantially airfoil configuration.

11. A plurality of barriers as described in claim 9 wherein said barriers are spaced circumferentially from one another about said duct wall.

12. The plurality of barriers of claim 11 wherein said duct wall defines a passage wherein is disposed a plurality of rotatable blades for driving fluid through the passage, said blades having a uniform blade chord, and said blades being disposed downstream of said barriers by a distance of at least two of said blade chords.

* * * * *